United States Patent Office 3,498,750
Patented Mar. 3, 1970

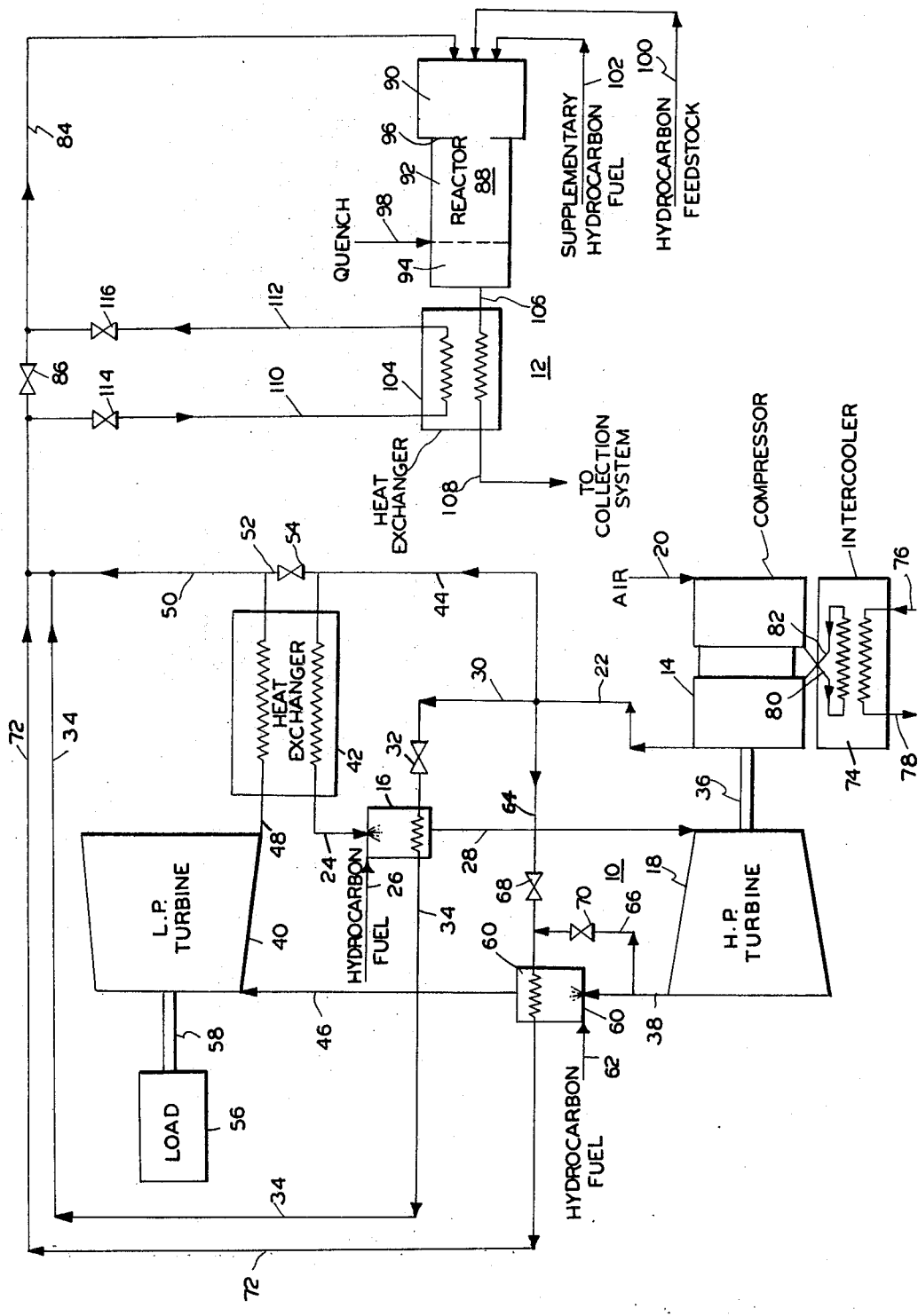

3,498,750
PRODUCTION OF CARBON BLACK
Travis S. Whitsel, Jr., Houston, Tex., assignor to Ashland Oil & Refining Company, Houston, Tex., a corporation of Kentucky
Filed July 12, 1965, Ser. No. 470,974
Int. Cl. C01b 31/02, 47/00; C09c 1/48
U.S. Cl. 23—209.4    3 Claims

ABSTRACT OF THE DISCLOSURE

A process and apparatus for the pyrolytic conversion of a reactant material, such as the pyrolytic conversion of a gaseous or liquid hydrocarbon to carbon black, which includes burning a hydrocarbon fuel, such as a hydrocarbon gas or liquid, in the presence of a combustion-supporting gas, such as air, utilizing the flue gases from the burning of the hydrocarbon fuel to compress the combustion-supporting gas and thereby reduce the temperature of the flue gas and thereafter utilizing the flue gas to supply at least a portion of the heat required for the pyrolytic reaction by contacting the reactant material with the flue gas and produce a pyrolytically reduced product of the reaction. A portion of the compressed air may be bypassed around the combustion step to further control the temperature of the flue gas utilized in the reaction chamber and a portion of the flue gas may also be utilized to cool the reaction products and also further control the temperature of the flue gas to the reaction zone.

---

The present invention relates to a process and apparatus for supplying and utilizing a hot reaction medium in endothermic reactions. In a more specific aspect, the present invention relates to an improved process and apparatus for the production of carbon black by the cracking or pyrolysis of hydrocarbons. Still more specifically, the present invention relates to an improved process and apparatus for the production of carbon black wherein a hydrocarbon feedstock is commingled with a hot substantially inert atmosphere.

In conventional processes for the manufacture of carbon black from a hydrocarbon feedstock, the energy necessary to rupture or crack the hydrocarbon feedstock is generally supplied by the combustion of a combustible material and/or part of the feedstock in the presence of a combustion-supporting gas. The hydrocarbon feedstock utilized in carbon black manufacture may be a normally gaseous hydrocarbon, a normally liquid hydrocarbon or mixtures thereof. The combustible material utilized to supply the heated atmosphere necessary to the reaction may be the same as, or different from, the feedstock, i.e., it may be a normally gaseous hydrocarbon, a normally liquid hydrocarbon or mixtures of the same. However, in the majority of cases, where liquid hydrocarbons are utilized as a feedstock for carbon black production the hot atmosphere is produced by utilizing a hydrocarbon gas as the combustible material. The combustion-supporting gas is an oxygen-bearing gas, usually air. In a specific situation, therefore, the feedstock would be a liquid hydrocarbon, the combustible material would be natural gas, principally methane, and the combustion-supporting gas would be air. Under these conditions it is the general practice to supply the combustible gas and the combustion-supporting gas to a precombustion or heating section or chamber of a refractory-lined furnace, in such volumes as to produce combustion products or flue gases at temperatures of about 1500° F. or higher. The hot flue gas or products of combustion are commingled with the liquid hydrocarbon feedstock and introduced into a reaction section or chamber of the furnace where the hot gases provide the heat necessary to crack the hydrocarbon feedstock to elemental carbon. The liquid hydrocarbon feedstock is generally introduced axially into the furnace by spraying the liquid under pressure or atomizing the liquid with air or the hydrocarbon gas used as the combustible material. Since the oxygen in the combustible mixture is generally far in excess of that necessary for a stoichiometric reaction with the combustible gas, a certain volume of the hydrocarbon feedstock is burned in the combustion section as well as the reaction section of the furnace. This partial burning of the hydrocarbon feedstock makes up in part for the energy needed for the cracking or pyrolysis reaction since this is an endothermic reaction. The resultant carbon black-bearing reaction gases are then subjected to well known supplementary procedures to recover the carbon black.

When employing the above method for the production of carbon black it is highly desirable, both from the standpoint of efficiency and economy, that the fuel or combustible material and the combustion-supporting gas be utilized in stoichiometric amounts to thereby provide hot flue gas for the reaction of the feedstock which is substantially inert or non-oxidizing. Unfortunately, experience has shown that the stoichiometric reaction of natural gas with air creates combustion products or flue gases whose temperatures are far too high for use in present day furnaces without serious damage to the furnace, since the life of a carbon black furnace is generally measured or controlled by the refractory lining of the furnace and refractory materials which are commercially available for this purpose are not capable of withstanding the high temperatures produced by the stoichiometric reaction of natural gas and air for any extended period of time. In actual practice, therefore, various modifications have been proposed to overcome the problem of overheating.

As previously indicated, the most widely used technique for preventing overheating is the supply of air in volumes far in excess of that needed for a stoichiometric reaction with the combustible material or fuel. It is, of course, quite obvious that the higher the ratio of air to fuel the lower will be the temperature of the combustion products or flue gases. For example, instead of utilizing 9.6 volumes of air per volume of methane in a stoichiometric reaction it is common practice in the art to use anywhere from 12 to 25 volumes of air per volume of methane. This obviously leads to a most inefficient operation. First, of all, a large part of the hydrocarbon feedstock will be burned during the combustion and cracking portions of the reaction because of the presence of excess of oxygen. Further, the supply of these large volumes of oxygen requires a great deal of energy to compress the air and/or fuel gas since these gases must be supplied under high pressure in order to obtain adequate mixing of the combustion mixture in the combustion section and adequate mixing of the combustion products with the hydrocarbon feedstock.

A second modification or variation of the basic carbon black process involves the injection of steam or other diluents into the furance while burning the fuel with stoichiometric amounts of oxygen into the region of combustion. Here again, the inefficiencies introduced should be quite apparent. Accordingly, although each of the modifications mentioned avoids the high temperatures which are detrimental to furnace linings, they nevertheless result in a low yield and contribute to poor product quality and lack of control over the nature of the product.

If, as previously pointed out, the carbon black reaction is carried out in a substantially inert atmosphere it is possible for the operator to have complete control of the reaction temperature and in this manner to make adjustments in product character and quality. It has therefore also been proposed that the combustion of the fuel and air be divided into two stages with a cooling operation being performed in an intermediate stage. While this type of operation permits one to control the temperature on the high side of the scale, there is a definite lower limit below which the temperature cannot be decreased. Therefore, it is also necessary in this type of operation to utilize diluents, as mentioned above, in order to operate at temperatures below this limit. Thus, extremely wasteful and inefficient utilization of fuel occurs both as a result of the inefficient dual-combustion with intermediate cooling and the dilution.

In light of the above, it is therefore highly desirable to be able to carry out an endothermic reaction in the presence of nonoxidizing or substantially inert atmosphere. It is therefore an object of the present invention to provide such a process and apparatus. Another object of the present invention is to provide an improved process and apparatus for the production of carbon black in the presence of a nonoxidizing atmosphere. Still another object of the present invention is to provide an improved process and apparatus for the production of carbon black which is carried out in the presence of a substantially inert, hot atmosphere. A further object of the present invention is to provide an improved process and apparatus for the production of carbon black in which the necessity of expending extraneous energy to operate air compressors or blowers is eliminated. Yet another object of the present invention is to provide an improved process and apparatus for the production of carbon black wherein a combustible mixture is employed to produce a hot gaseous atmosphere. Still another object of the present invention is to provide an improved process and apparatus for the production of carbon black wherein a combustible material is added to a hot flue gas containing oxygen. Another and further object of the present invention is to provide an improved process and apparatus for the production of carbon black in which combustible materials are present in substantially stoichiometric amounts. Another object of the present invention is to provide an improved process and apparatus for the production of carbon black in which the fuel employed for the production of a hot reaction atmosphere is converted directly to compressional energy for the combustible gas mixture. Still another object of the present invention is to provide an improved process and apparatus for the production of carbon black wherein the carbon black reactor is supplied with an air-fuel mixture at lower than normal ratios without exceeding the temperature limits of the refractory lining of the furnace. A still further object of the present invention is to provide an improved process and apparatus for the production of carbon black in which a high degree of control over the reaction temperature is attained. Another object of the present invention is to provide an improved process and apparatus for the production of carbon black in which the quality and character of the product can be readily controlled. A further object of the present invention is to provide an improved process and apparatus for the production of carbon black wherein the temperature of the reaction can be increased or decreased at will and without damaging the refractory lining of the reactor. Yet another object of the present invention is to provide an improved process and apparatus for the production of carbon black which can be carried out at temperatures as great as 100° F. below the minimum temperatures heretofore attainable in carbon black processes.

In accordance with the present invention, it has been surprisingly discovered that a highly efficient and readily controllable endothermic process can be carried out by burning at least a portion of the hydrocarbon fuel, utilized for the production of a hot atmosphere, externally of the reaction zone and in the presence of an excess of combustion-suporting gas; removing a portion of the heat from the resultant combustion products by utilizing the energy of the hot combustion products to perform useful work; thereafter, introducing the partially-cooled combustion products to a reactor where they are intimately mixed with a feedstock in a combustion zone; and, finally, subjecting the feedstock to an endothermic reaction in a reaction zone of the reactor. In one variation of this technique the hot combustion products, which are introduced to the reactor, may have a supplementary fuel added thereto to supply additional heat and to accommodate excess oxygen present in the flue gas. Accordingly, by this technique it is possible to produce in the reaction zone of the furnace non-oxidizing or substantially inert atmosphere at temperatures which are not harmful to present day equipment and at temperatures which are under the complete control of the operator.

For a detailed description of the present invention, reference will now be made to the drawing which shows schematically the equipment for the operation of the present process.

In the drawing the numeral 10 generally designates a pre-combustion or flue gas generating system. The pre-combustion or flue gas generating system is combined with a reactor system 12. As will be pointed out in greater detail hereinafter, the flue gas generating system 10 is preferably what is commonly referred to as a "bypass turbine." The bypass turbine comprises three basic components; namely, a compressor 14, a burner or combustor 16 and a turbine 18. Air at atmospheric pressure is supplied to compressor 14 through supply line 20. The compressed air is discharged from compressor 14 through compressed air line 22. After the performance thereon of certain auxiliary treatments, which will be mentioned hereinafter, the air passes to combustor 16 through line 24. Combustor 16 is also supplied with a hydrocarbon fuel through hydrocarbon fuel supply line 26. The fuel supplied to combustor 16 may be either a gas, such as a hydrocarbon gas, or a liquid, such as a hydrocarbon oil. The air supplied through air line 20 to compressor 14 is utilized in amounts well in excess of those necessary for the complete combustion of the fuel. If a hydrocarbon gas, such as natural gas, is employed as the fuel, the air can be supplied in quantity equal to 12 to 15 volumes of air per volume of natural gas. Where a liquid hydrocarbon oil is employed as a fuel, the ratio will normally be about 50 to 100 pounds of air per pound of oil. The combustion products or flue gas from combustor pass to turbine 18 through line 28. In the bypass turbine one may bypass the combustion chamber with a portion of the compressed air. Such bypassing is effected through line 30 and control valve 32. Control valve 32 may be manually or automatically operable. In any event, control valve 32 passes a preselected part of the compressed air from compressor 14 in indirect heat exchange with the combustion chamber 16, usually through a shell surrounding combustion chamber 16. This bypassing of a portion of the compressed air permits a high degree of control of both the operation of the turbine and the character of the flue gas produced. By withdrawing or bypassing a portion of the compressed air one may readily control the inlet temperature to the turbine and thus maintain the turbine inlet temperature at rated maximum for partial loads on the turbine. Since wihdrawal of a portion of the excess oxygen lowers the air-fuel ratio, such withdrawal also reduces the amount of fuel which must be burned to bring the gas to rated turbine inlet temperatures and thereby improves thermal efficiency. In addition, the bypassing places within the operator's control the temperature of the combustion zone itself. Finally, such bypassing of a portion of the compressed air permits control of the volume of oxygen present in the flue gas from the flue gas generating system since the bypassed compressed air is discharged through line 34, passes downstream and eventually combines with flue gas from the system. Thus, control valve 32 may be manually or automatically operated in accordance with the combustor inlet or outlet temperature or as dictated by any other condition. Since this compressed air is in indirect heat exchange with the combustor 16 the bypassed air is heated to a determinable temperature approaching that of the flue gas from the flue gas generation system. Accordingly, the temperature of the combined flue gas and bypassed air may also be controlled to some extent by adjusting the volume of compressed air which is bypassed.

In a basic bypass turbine the turbine 18 drives the compressor 14 through shaft 36. Accordingly, the burning of the fuel gas to produce hot flue gases under pressure, which in turn operate the turbine, performs all of the work of compression necessary to the system. In doing this compressional work, energy is extracted from the hot combusion products or flue gases passing from combustor 16 to turbine 18 and the flue gas or hot combustion products are cooled in the process and discharged through line 38. This cooled flue gas can be passed directly to the reactor system 12 to thus provide a substantially inert atmosphere for the endothermic reaction. Depending upon the initial ratio of oxygen to fuel utilized in combustor 16 the flue gas or hot combustion products discharged through line 38 may contain, and usually do contain, a quantity of oxygen. As previously indicated, oxygen can also be added to the flue gas as a result of the bypassing of a portion of the compressed air around the combustion chamber. In such a basic bypass turbine the turbine would also be capable of doing additional useful work by driving a load (not shown). The load thus driven by turbine 18 could be any appropriate device, such as an electrical generator or the like. In driving the load the turbine 18 would extract additional energy from the hot flue gas driving the turbine and thus further reduce the temperature of the flue gas discharged through line 38.

Since a conventional single shaft turbine comprised of a compressor, a combustor and a turbine is generally not the ultimate in efficiency, the drawing shows what is termed a "two-shaft" or "regenerative cycle" turbine. This type of turbine is much more efficient than a single shaft turbine which drives both the load and the compressor from the same turbine shaft. In accordance with the drawing, therefore, the turbine 18 is a high pressure turbine or gas producer turbine. This high pressure or gas producer turbine is combined with a low pressure or power turbine 40 and a heat exchanger or regenerator 42. In this regenerative turbine air from compressor 14 is passed through line 44 in indirect heat exchange with flue gas from turbine 40 prior to entering supply line 24 of combustor 16. This procedure results in a highly effective and efficient burning of the hydrocarbon fuel and also permits better control of the system. The heated, compressed air introduced to combustor 16 is, of course, utilized in the burning of the hydrocarbon fuel to produce hot combustion gases which drive high pressure turbine 18. High pressure turbine 18, as shown in the drawing, performs no other function than to produce a precooled flue gas through line 38 and drive compressor 14. The precooled or partially cooled combustion gas discharged from high pressure turbine 18 is fed to low pressure turbine 40 through line 46. The hot flue gas from low pressure turbine 40 is discharged through line 48. The hot flue gas from line 48 then passes through heat exchanger 42 in indirect heat exchange with compressed air from line 44. Hot flue gas which has been cooled to some extent in heat exchanger 42 is thereafter discharged through line 50. As previously indicated, bypassed compressed air through line 34 is combined with the flue gas in line 50. Another alternative would be to bypass both combustor 16 and heat exchanger 42 with a part of the compressed air from line 44. This can be accomplished through line 52 which connects to flue gas line 50 and which is controlled by valve 54. Thus, it is to be seen that a hot flue gas, whose temperature can be controlled by any or all of several control techniques, preferably by regenerative heat exchange with compressed air to the system, and of controlled oxygen content, which can be accomplished by one or all of a variety of techniques, preferably by bypassing the combustion chamber with at least a portion of the compressed air can be provided. Low pressure turbine 40 performs no work in the compression of the air to the system since all such compression is performed by high pressure turbine 18. Accordingly, low pressure turbine 40 is a power turbine and its primary function is to drive a load 56 through shaft 58. While, as indicated, the driving or load 56 is the ultimate and only function of a conventional turbine system this is in essence a secondary function in the present invention since the ultimate or primary function is to produce a controlled hot gaseous atmosphere for use in reactor system 12 and the loading of low pressure turbine 40 is used to reduce the temperature of the flue gas.

Certain optional operations can also be performed in connection with flue gas generating system 10. For example, the partially cooled flue gas from high pressure turbine 18 which is discharged through line 38 may be passed to reheater or combustor 60. Reheater 60 is supplied with hydrocarbon fuel through fuel supply line 62. Reheater 60, as its name indicates, reheats or readjusts upwardly the temperature of the partially cooled flue gas emanating from high pressure turbine 18. This reheating of the flue gas passing through line 38 is therefore adapted to raise the temperature of the flue gas back to its original temperature of about 1450° F. As indicated, reheater 60 is optional. However, it can be utilized to increase the air rate through the system and the work ratio of the system when preceded by a partial expansion of the gas in high pressure turbine 18. Reheater 60 may also be operated so as to control the temperature of the flue gas from the system and its oxygen content. This of course is done in substantially the same manner as was done in combustor 16, that is, by passing at least a part of the combustion supporting gas in indirect heat exchange with combustor 60. In this particular instance, however, the bypassing can be bypassing part of the compressed air from line 22 through line 64 or bypassing a portion of the flue gas from line 38 through line 66, or both. The amount of compressed air passed through combustor 60 may be controlled by valve 68 and the amount of flue gas passed through combustor 60 by control valve 70. The bypassed compressed air and/or flue gas is discharged through line 72 and ultimately combines with the flue gas discharged through the line 50 of the system. Improved control of the flue gas generating system 10 may also be accomplished by providing intercooler 74 for compressor 14. Intercooler 74 is supplied with appropriate cooling fluid through line 76 which cooling fluid is discharged through line 78. The cooling fluid through intercooler 74 serves to indirectly cool air being compressed in compressor 14. Accordingly, air passing through compressor 14 enters intercooler 74 through line 80 and returns to compressor 14 through line 82. The primary purpose of intercooler 74 is to reduce the work of compression to some degree. The use of an intercooler, however, is not too prevalent and, accordingly, the intercooler is an optional part of the gas generating system. Flue gas and/or oxygen discharged through lines 34, 50 and 72 combine in line 84 where they pass to reactor system 12. The gas passing through line 84 is made up primarily of combustion products of the gas generating system 10 and excess oxygen. The temperature of this gas is between about 600° and 1150° F. It should be recognized that all of the lines carrying heated gases are preferably insulated to maintain the desired temperature and prevent fluctuations due to changing ambient conditions. Valve 86 is provided in line 84 for purposes which will be pointed out hereafter. Flue gas line 84 is connected to the reactor system 12 at the inlet or upstream end of reactor 88. Reactor 88 is shown as a carbon black reactor although other reactors for carrying out an endothermic reaction may be used. In addition, while any carbon black furnace is suitable for the production of carbon black by the present technique, the preferred combination of the present invention includes a tunnel- or tube-type furnace. A highly effective furnace of this type is described in detail in U.S. Patent 3,060,003. Briefly, the reactor 88 is comprised of three basic sections, the combustion section 90, the reaction section 92, and the quench section 94. The combustion section 90 is divided from the reaction section 92 by constriction or orifice 96. Orifice 96 serves to mix any reactant gases introduced and the hot flue gas from line 84 with the hydrocarbon feedstock before these materials pass to reaction section 92. By this mixing or intimate contact a more efficient and effective reaction is attained. While reaction section 92 is shown as divided from quench section 94 by a dashed line this is in many cases simply an imaginary division. Actually, sections 92 and 94 are a continuous, elongated tube and the division shown is simply a division created by the radial injection of a cooling or quench fluid through line 98. This quench fluid is usually water and serves to stop the reaction at a particular point and thus to control to some extent the nature and quality of the carbon black product. The hydrocarbon feedstock to the reactor 88 is also introduced at the upstream end through line 100. Normally, this hydrocarbon feedstock is a heavy aromatic petroleum oil or a cold tar residual oil and it is sprayed or otherwise injected axially into the combustion section 90. Introduction may also be aided by pressure supplied from a part of the flue gas supplied by line 84. The hydrocarbon feedstock could also be atomized by a small amount of compressed air, but as previously indicated, the primary purpose of the present invention is to eliminate the necessity of an extraneous source of compressed air. Since an excess of oxygen is contained in flue gas charged to combustion section 90, some of the feedstock will normally burn in the excess oxygen and this combustion coupled with the heat of the flue gas provides the energy necessary for the pyrolysis or cracking of the unburned portion of the oil. The ratio of the flue gas input to the cross-sectional area of the opening of orifice 96 is a critical factor in the production of high abrasion-resistance carbon blacks, since this orifice controls the degree of mixing and turbulence in the reaction zone. Dispersion or intimate contact of the hydrocarbon feedstock with the flue gas is also a critical factor in determining the nature and quality of the carbon black. However, the biggest factor contributing to the nature and quality of the carbon black product is the temperature in the reaction zone. Thus, the temperature should be subject to close control. This, as previously pointed out, is readily accomplished in accordance with the present invention. As an alternative operation, instead of burning a portion of the hydrocarbon feedstock to consume the excess oxygen and supply the additional heat necessary for the endothermic reaction, the excess oxygen may be consumed by a supplementary hydrocarbon fuel introduced through line 102. The supplementary hydrocarbon fuel may be the same as or different from the hydrocarbon fuel utilized in combustors 16 and 60. This hydrocarbon fuel may be introduced in substantially stoichiometric volumes so that a nonoxidizing or inert atmosphere is produced by the time the hot gas and the hydrocarbon feedstock passes to the reaction section. The utilization of such an inert or nonoxidizing atmosphere for the reaction contributes greatly to the economy and efficiency of the process as well as the nature and quality of the carbon black product.

By utilizing flue gases generated by the gas generating system 10 in the reactor system 12, it is possible to carry out a carbon black reaction at temperatures as much as 100° F. below the minimum temperature which can be attained in conventional carbon black processes. It must be reiterated that this is an important factor in the control of the carbon black process.

Still further control of the temperature in reactor 88, and thus of the nature and quality of the carbon black product, is possible by the use of an auxiliary generator or heat exchanger 104. Hot carbon black-bearing gases from reactor 88 are discharged from the reactor through line 106. From line 106 the product gases may be passed through heat exchanger 104 in indirect heat exchange with all or a portion of the hot flue gas prior to the time that the flue gas is fed to the upstream end of the reactor. From heat exchanger 104 the product gases are discharged through line 108 where they pass to a conventional carbon black collection system (not shown). Since the temperature of the turbine-generated flue gases can be conveniently reduced to a point well below that which can ordinarily be accomplished in carbon black operations, adequate control of a temperature at the lower end of the scale is attained by the heat exchanger 104. If, on the other hand, one wishes to heat the flue gas in line 84 and effect heat control at the upper end of the scale, a part of the flue gas mixture passing through line 84 may be diverted and passed to heat exchanger 104 through line 110. In heat exchanger 104 the flue gas is heated and discharged through line 112 back to flue gas line 84. Control of the volume of flue gas passed to heat exchanger 104 is obtained by valve 86 in line 84, valve 114 in line 110 and valve 116 in line 112. Thus, by closing valve 86 and opening valves 114 and 116, all of the flue gas can be heat exchanged with product gases from the reactor.

It is to be observed, with respect to the bypass turbine that the two turbines, that is, turbine 18 and turbine 40, have separate shafts and separately drive compressor 14 and load 56, respectively. This is of course where the system receives its designation as a two-shaft turbine. Under this arrangement, however, it should further be observed that, while the schematic drawing shows the turbines as distinct elements connected by flow lines, the major components of a bypass turbine are usually one unitary mechanism. Even the combustion chambers and heat exchange units are usually incorporated in a single, unitary casing with the turbines. In any event, the provision of a dual turbine system, such as that of the regenerative turbine system, results in the high pressure turbine driving only the compressor and the low pressure turbine driving only the load. This arrangement permits one to vary the air flow through the unit with load while the low pressure turbine is turning at a constant speed. Thus the advantage lies in making it possible to keep the turbine inlet temperature at its rated maximum even at part loads and the part load thermal efficiency is raised above that which is possible with a single shaft unit. The rotatable blades of the nozzles of both the high pressure and the low pressure turbines can also be designed to be varied in cross-sectional area and to thus permit variation of the area available to gas flow. This design feature limits overspeeds in case of high load losses, improves heat rate at part loads, raises the unit capacity at higher air temperatures, reduces the starting power and eases the running at no load while synchronizing the load with the demands on the load. In a system of this character it is also possible to provide water-cooled pads facing the turbine wheels in order to keep these parts cool by radiation. The shafts of the low pressure and high pressure turbine nozzle means may also be water-cooled to eliminate binding and overheating.

To take a specific example, a bypass turbine of a character previously described was operated at temperatures of 60° and 90° F. and at flue gas discharge pressures of 0 p.s.i.g. and 7 p.s.i.g. The table which follows sets forth the operating variables in a system of this character when the fuel gas input was about 5,000 standard cubic feet per hour and the air input was about 198,500 to 213,000 standard cubic feet per hour.

|  | Air inlet temperature | | | |
| --- | --- | --- | --- | --- |
|  | 60° F. | | 90° F. | |
|  | 0 p.s.i.g. | 7 p.s.i.g. | 0 p.s.i.g. | 7 p.s.i.g. |
| Turbine inlet temp., ° F | 1,610 | 1,610 |  |  |
| Rated shaft horsepower | 390 | 179 | 328 | 151 |
| Exhaust gas temp., ° F | 980 | 1,130 |  |  |
| Exhaust gas flow, s.c.f.h | 218,000 | 218,000 | 203,500 | 203,500 |
| Fuel gas input, s.c.f.h | 5,000 | 5,000 | 5,000 | 5,000 |
| Air intake, s.c.f.h | 213,000 | 213,000 | 198,500 | 198,500 |
| Air in exhaust gas, s.c.f.h | 165,000 | 165,500 | 151,000 | 151,000 |

From the above table it is quite obvious that flue gas can be provided for the operation of a furnace-type carbon black reactor at temperatures in the neighborhood of 1,000° F. In addition, the load output of the turbine can be varied from about 150 to 390 H.P., thereby also providing usable power for other plant uses. When the back pressure on the exhaust was maintained at about 2 p.s.i.g. it was estimated that the power output would be 330 H.P. at 60° F. and 277 H.P. at 90° F. Therefore, by utilizing two such bypass turbines to operate a single carbon black furnace, of the character previously described, the capacity of the furnace can be maintained at about 15 million pounds per year while producing about 550 H.P. of usable power to the plant. In this particular instance the turbine exhaust output of the flue gas fed to the furnace would be about 400,000 standard cubic feet per hour at a temperature of about 600° F.

While specific examples of the present invention have been set forth above and specific items of equipment and combinations thereof have been described and illustrated, it is to be recognized that these examples and illustrations are for purposes of clarity of explanation only. Accordingly, the present invention is to be limited only by the appended claims.

I claim:
1. A process for the production of carbon black, comprising, burning a hydrocarbon fuel in the presence of a compressed, combustion-supporting gas; extracting a predetermined portion of the heat energy of the combustion products of said burning step by utilizing at least a part of said combustion products to drive a turbine system, including a load and a compressor for said combustion-supporting gas; passing the first mentioned compressed, combustion-supporting gas in indirect heat exchange with the partially cooled combustion products of said heat extracting step; combining a second portion of compressed, combustion-supporting gas with the partially cooled combustion products of said heat extracting step; contacting a hydrocarbon feedstock with said combined second portion of compressed, combustion-supporting gas and said partially cooled combustion products of said heat extracting step; and recovering carbon black from said contacting step.

2. A method in accordance with claim 1 wherein the second portion of compressed, combustion-supporting gas is passed in indirect heat exchange through the hot gases of the burning step prior to combination with the partially cooled combustion products of the heat extracting step.

3. A process in accordance with claim 1 wherein the turbine system includes a high pressure turbine adapted to produce a hot flue gas containing excess oxygen; said hot flue gas is utilized to operate a second turbine; said high pressure turbine is used exclusively for the compression of the combustion-supporting gas; said second turbine is used exclusively to drive a load; and a third portion of compressed, combustion-supporting gas is passed in indirect heat exchange through the hot gases in a second burning zone adapted to burn additional fuel with the hot flue gases from said high pressure turbine and combined with the partially cooled combustion products of said heat extracting step.

References Cited
UNITED STATES PATENTS

| 3,095,699 | 7/1963 | Baver | 60—39.02 |
| 3,167,913 | 2/1965 | Muhlberg et al. | 60—39.02 |
| 3,289,409 | 12/1966 | Schirmer | 60—205 |

FOREIGN PATENTS 585,105    10/1959    Canada.

EDWARD J. MEROS, Primary Examiner

U.S. Cl. X.R.

23—259.5